(12) United States Patent
Yokoyama et al.

(10) Patent No.: US 10,556,527 B2
(45) Date of Patent: Feb. 11, 2020

(54) VEHICLE SEAT

(71) Applicant: TACHI-S CO., LTD., Akishima-shi, Tokyo (JP)

(72) Inventors: Takashi Yokoyama, Tokyo (JP); Takumi Yamakawa, Tokyo (JP); Takayuki Nosaka, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 15/768,541

(22) PCT Filed: Oct. 21, 2016

(86) PCT No.: PCT/JP2016/081346
§ 371 (c)(1),
(2) Date: Apr. 14, 2018

(87) PCT Pub. No.: WO2017/073490
PCT Pub. Date: May 4, 2017

(65) Prior Publication Data
US 2018/0304786 A1 Oct. 25, 2018

(30) Foreign Application Priority Data
Oct. 27, 2015 (JP) ................................. 2015-210782

(51) Int. Cl.
*B60N 2/66* (2006.01)
*A47C 7/46* (2006.01)
(Continued)

(52) U.S. Cl.
CPC .............. *B60N 2/6673* (2015.04); *A47C 7/46* (2013.01); *B60N 2/22* (2013.01); *B60N 2/66* (2013.01);
(Continued)

(58) Field of Classification Search
CPC ...... B60N 2/6673; B60N 2/667; B60N 2/666; A47C 7/46
See application file for complete search history.

(56) References Cited

U.S. PATENT DOCUMENTS 3,463,544 A * 8/1969 Froelich ................... B60N 2/66
297/284.7
5,947,558 A * 9/1999 Suzuki ................... A47C 7/462
297/284.4
(Continued)

FOREIGN PATENT DOCUMENTS

CA 2334379 A1 * 12/1999 ............. B60N 2/667
DE 3336349 A1 * 4/1985 ............. A47C 7/462
(Continued)

OTHER PUBLICATIONS

International Search Report from International Patent Application No. PCT/JP2016/081346, dated Jan. 24, 2017.
(Continued)

*Primary Examiner* — Timothy J Brindley
(74) *Attorney, Agent, or Firm* — Shapiro, Gabor and Rosenberger, PLLC (57) ABSTRACT

A vehicle seat provided with a seat cushion and a seat back, wherein the seat back is provided with: a urethane pad in which the surface is covered by a trim cover; and a pressure means in which a laterally extending shaft and a pair of pressing parts in the vertical direction relative to the shaft are formed on the reverse side of the urethane pad toward the side covered by the trim cover, and a configuration is adopted such that the shaft extending in the lateral direction of the pressure means rotates or swings, thereby causing the upper-side pressing part among the upper and lower pair of pressing parts to press the upper side of the urethane pad
(Continued)

forward and the lower-side pressing part to press the lower side of the urethane pad forward.

12 Claims, 9 Drawing Sheets

(51) Int. Cl.
  *B60N 2/22* (2006.01)
  *B60N 2/70* (2006.01)
  *B60N 2/02* (2006.01)

(52) U.S. Cl.
  CPC ............. *B60N 2/666* (2015.04); *B60N 2/667* (2015.04); *B60N 2/70* (2013.01); *B60N 2002/0272* (2013.01)

(56) References Cited

U.S. PATENT DOCUMENTS

| 2011/0062757 | A1 | 3/2011 | Colja et al. | |
| 2013/0175838 | A1 | 7/2013 | Oshima et al. | |
| 2015/0246627 | A1* | 9/2015 | Shimizu | B60N 2/66 297/216.14 |
| 2016/0374475 | A1* | 12/2016 | Aldrich | A47C 7/462 297/284.3 |
| 2018/0035809 | A1* | 2/2018 | Schwarzbich | A47C 7/465 |

FOREIGN PATENT DOCUMENTS

| JP | 58-149954 U | 10/1983 | |
| JP | 60-091059 U | 6/1985 | |
| JP | 62-171964 U | 10/1987 | |
| JP | 04-026827 U | 3/1992 | |
| JP | 04-091158 U | 8/1992 | |
| JP | 06-253950 A | 9/1994 | |
| JP | 2013-504463 A | 2/2013 | |
| JP | 5594366 B2 | 9/2014 | |
| KR | 1998-0030252 U | 8/1998 | |
| KR | 2003-0021087 A | 3/2003 | |
| WO | WO-2014066493 A2 * | 5/2014 | ............... B60N 2/66 |
| WO | WO-2016199701 A1 * | 12/2016 | ............... A47C 7/46 |

OTHER PUBLICATIONS

Office Action, dated May 27, 2019, in European Patent Application No. 16859720.1.
Office Action, dated Jun. 4, 2019, in Japanese Application No. 2015-210782.

* cited by examiner

VEHICLE SEAT

TECHNICAL FIELD

The present invention relates to a vehicle seat used for a vehicle such as an automobile and a truck. Specifically, the present invention relates to the vehicle seat including a support mechanism for pressing and supporting a seated occupant's back.

BACKGROUND ART

Patent Literature 1 discloses the vehicle seat with the support mechanism for pressing and supporting the back of the occupant, specifically, the vehicle seat with the support mechanism for pressing two body parts, that is, the lumbar and the pelvis.

The support mechanism for pressing the lumbar and the pelvis of the occupant seated on the vehicle seat as disclosed in Patent Literature 1 includes a mechanism unit for pressing and supporting the lumbar and pelvis at two left points and two right points, respectively. The mechanism unit is driven by the actuator.

CITATION LIST

Patent Literature

Patent Literature 1: Japanese Unexamined Patent Application Publication (Translation of PCT Application) No. 2013-504463

SUMMARY OF INVENTION

Technical Problem

The vehicle seat disclosed in Patent Literature 1 is configured to press and support the lumbar and the pelvis at two left points and two right points, respectively. Therefore, the mechanism configured to link the left and right mechanisms is required. The increased number of the components may make the weight of the structure heavier, resulting in increased material cost.

In the case of a manually driven structure instead of using the actuator, the lever and dial may be necessary for assisting the operation. There may be the case where the lever and the dial have to be changed during operations, thus making the operation complicated.

In the case of switching the drive scheme for driving the mechanism unit which presses and supports the lumbar and the pelvis at the two left points and two right points between the electric mode using the actuator and the manual mode, it is difficult to share the components.

For solving the above-described problem of the related art, the present invention provides the vehicle seat with a support mechanism for pressing and supporting the seated occupant's back. Specifically, the mechanism unit for pressing and supporting the lumbar and the pelvis of the seated occupant is simplified so as to be formed with the fewer components, and is configured to allow the components to be shared when switching the drive scheme.

Solution to Problem

In order to solve the above-described problem of the related art, the present invention provides a vehicle seat that includes a seat cushion on which an occupant is seated, and a seat back on which the back of the occupant seated on the seat cushion reclines. The seat back includes a urethane pad having its surface covered with a trim cover, and a pressing device having a laterally extending shaft and press members arranged at upper and lower sides in a longitudinal direction with respect to the shaft at the back side of the urethane pad surface covered with the trim cover. The laterally extending shaft of the pressing device is rotated or oscillated to allow the press member at the upper side to press an upper part of the urethane pad forward, or the press member at the lower side to press a lower part of the urethane pad forward.

In order to solve the above-described problem of the related art, the present invention provides a vehicle seat that includes a seat cushion on which an occupant is seated, and a seat back on which the back of the occupant seated on the seat cushion reclines. The seat back includes a urethane pad having its surface covered with a trim cover, and a pressing device having a resin plate for supporting a part of the urethane pad, a laterally extending shaft, and press members arranged at upper and lower sides in a longitudinal direction with respect to the shaft at the back side of the urethane pad surface covered with the trim cover. The laterally extending shaft of the pressing device is rotated or oscillated in one direction so that the press member at the upper side presses an upper part of the urethane pad forward via the resin plate. The laterally extending shaft of the pressing device is rotated or oscillated in a direction opposite to the one direction so that the press member at the lower side presses a lower part of the urethane pad forward via the resin plate.

Advantageous Effects of Invention

According to the present invention, the mechanism unit for pressing and supporting the lumbar and the pelvis of the occupant seated on the vehicle seat may be simply configured with fewer components.

According to the present invention, the components for the mechanism unit may be shared when switching the drive scheme of the support mechanism configured to press and support the back of the occupant seated on the vehicle seat.

DESCRIPTION OF EMBODIMENT

The present invention relates to a vehicle seat including a seat cushion on which an occupant is seated, and a seat back on which the back of the occupant seated on the seat cushion reclines. The seat back includes a urethane pad having its surface covered with a trim cover, and a pressing device including a laterally extending shaft and press members arranged at upper and lower sides in a longitudinal direction with respect to the shaft. The pressing device is disposed at the back side of the urethane pad surface covered with the trim cover. Upon rotation or oscillation of the laterally extending shaft of the pressing device in one direction, the press member at the upper side presses the upper part of the urethane pad forward. Upon rotation or oscillation of the laterally extending shaft of the pressing device in the opposite direction, the press member at the lower side presses the lower part of the urethane pad forward.

Examples of the present invention will be described referring to the drawings.

FIRST EXAMPLE

Figure 1:
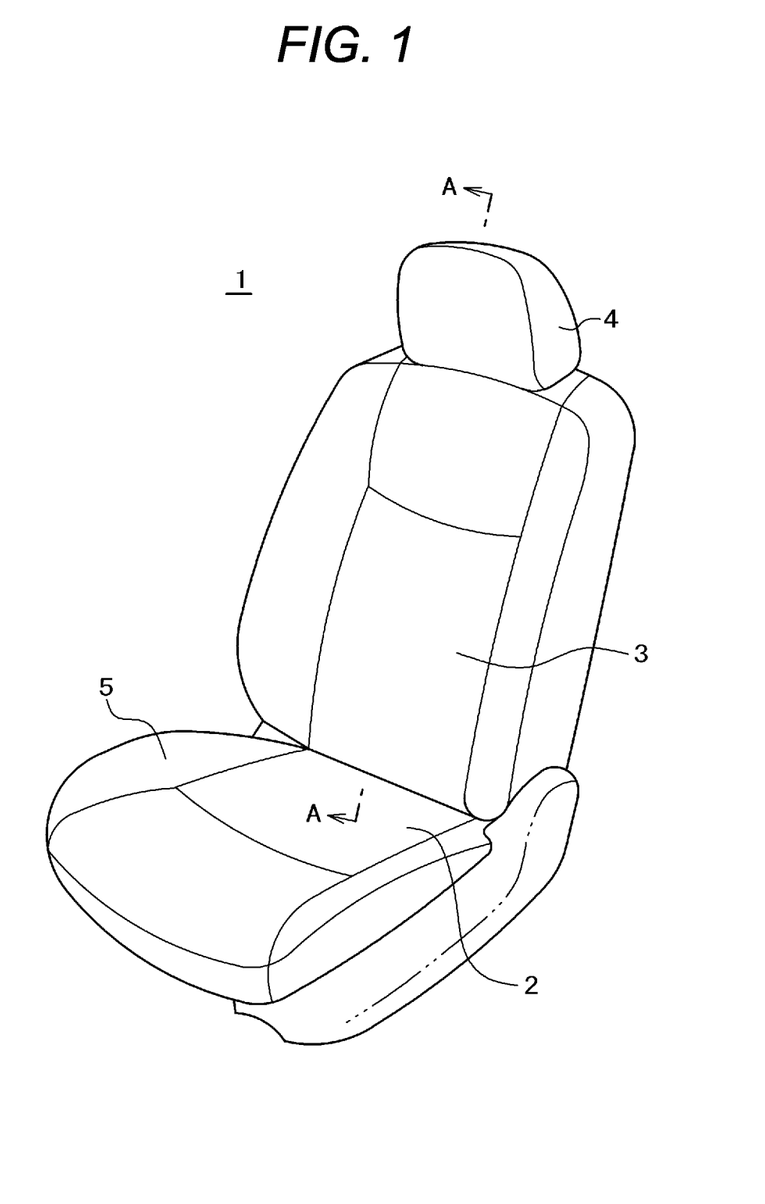
FIG. 1 is a perspective view of a vehicle seat according to the present invention.

FIG. 1 illustrates a basic structure of a vehicle seat 1 according to the present invention. The vehicle seat 1 includes a seat cushion 2 on which an occupant is seated, a seat back 3 on which the back of the occupant seated on the seat cushion reclines, and a head rest 4 which supports the occupant's head. Rising side supports 5 are provided at both sides of the seat cushion 2.

Figure 2:
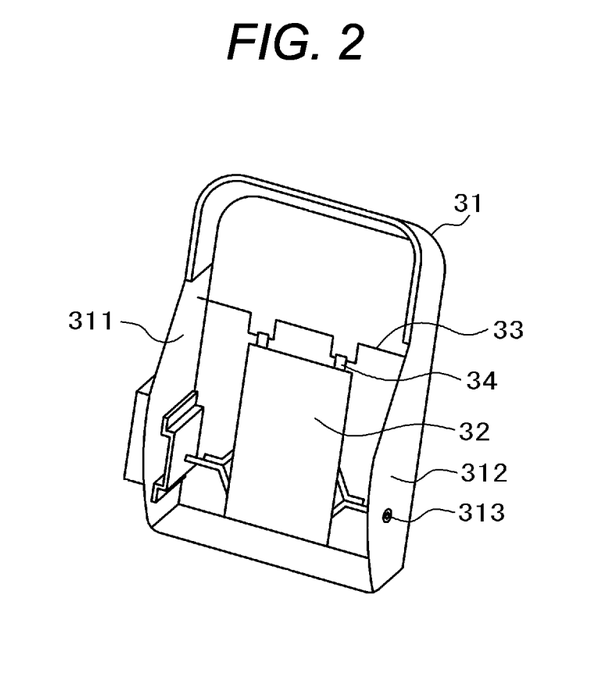
FIG. 2 is a perspective view of a seat back indicating the state where a urethane pad is removed from the seat back of the vehicle seat according to a first example of the present invention.

FIG. 2 shows a state where members of the seat back 3 at the upper side (the surface in contact with the back of the seated occupant) are removed. A reference numeral 31 refers to a seat frame, constituting a contour shape of the seat back 3. A reference numeral 32 refers to a resin plate in contact with a back surface of a urethane pad 39 (see FIG. 6). A reference numeral 33 refers to a spring wire that spans between side plates 311 and 312 at both sides of the seat frame 31, on which a hook 34 attached to an upper end of the resin plate 32 is hooked so that the resin plate 32 is held.

Figure 3:
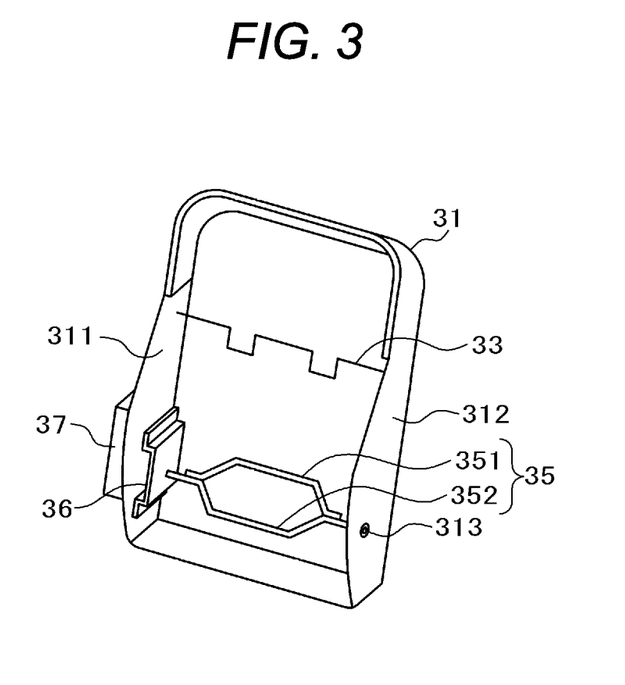
FIG. 3 is a perspective view of the seat back indicating the state where the urethane pad and a resin plate are removed from the seat back of the vehicle seat according to the first example of the present invention.

FIG. 3 shows the seat frame 31 in the state where the resin plate 32 as shown in FIG. 2 is removed. Provided at the back side of the resin plate 32 are a torsion bar 35, a gear mechanism 36, and a drive unit 37. The torsion bar 35 is formed by fixedly combining an upper torsion bar 351 and a lower torsion bar 352. The gear mechanism 36 serves to rotationally drive the torsion bar 35 having one end fixed. The drive unit 37 serves to drive the gear mechanism 36. The other end of the torsion bar 35 is supported with a bearing 313 fixed to the side plate 312.

Figure 4:
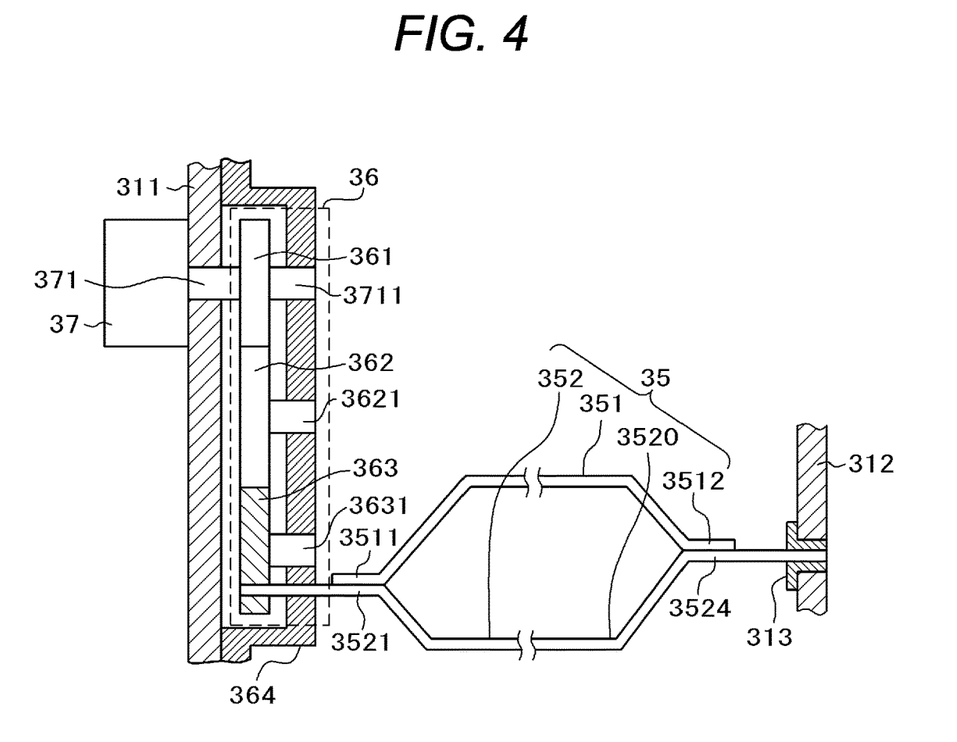
FIG. 4 is a front view of a seat back frame and a torsion bar of the vehicle seat according to the first example of the present invention.

FIG. 4 illustrates the torsion bar 35, the gear mechanism 36, and the drive unit 37 in detail. An electric motor is used as the drive unit 37. The gear mechanism 36 includes a first gear 361 engaged with an output shaft 371 of the drive unit 37, while having a top end 3711 supported with a bracket 364, a second gear 362 meshed with the first gear 361, which is rotatably engaged with a shaft 3621 that is fixedly supported with the bracket 364, and a third gear 363 meshed with the second gear 362, which is rotatably engaged with a shaft 3631 that is fixedly supported with the bracket 364.

In the example as shown in FIG. 4, an end 3521 of the lower torsion bar 352 is fixed to the third gear 363 at a point which is eccentric to the shaft 3631. The other end 3524 of the lower torsion bar 352 is supported on the side plate 312 with the bearing 313 fixed at the position on the extension from the shaft 3631 of the third gear 363.

The right end 3524 and the left end 3521 of the torsion bar 35 are supported at different axial centers. Therefore, the upper torsion bar 351 is shaped differently from the lower torsion bar 352.

Figure 5:
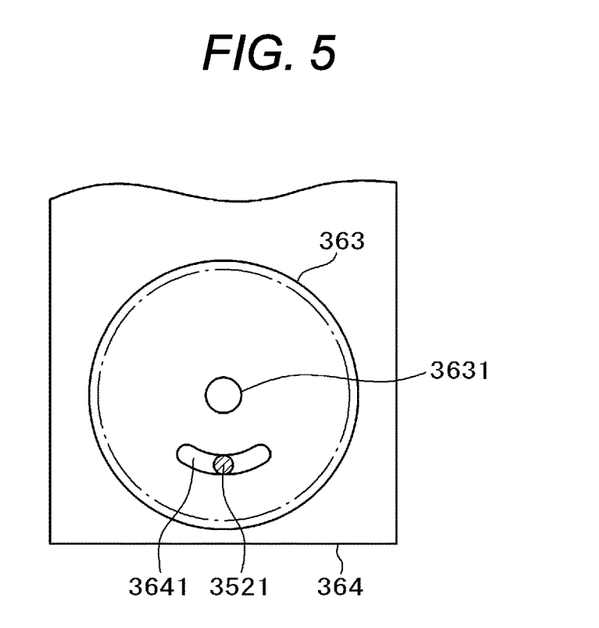
FIG. 5 is a front view of a bracket that regulates an oscillation angle of the torsion bar of the seat back frame for the vehicle seat according to the first example of the present invention.

According to the example, as shown in FIG. 5, the bracket 364 has a guide groove 3641 for regulating a movable range of the end 3521 of the lower torsion bar 352 fixed to the third gear 363. The guide groove 3641 is a long hole having the center of the shaft 3631 of the third gear 363 as the center of the curvature radius. The guide groove 3641 serves to regulate a rotation range of the end 3521 of the lower torsion bar 352 fixed to the third gear 363 so as to control the oscillation angle of the torsion bar 35.

The ends 3511 and 3512 of the upper torsion bar 351 are welded to the ends 3521 and 3524 of the lower torsion bar 352, which are respectively supported with the third gear 363 and the side plate 312.

When the drive unit 37 is rotationally driven in the above-described structure, the first gear 361, the second gear 362, and the third gear 363 are rotated. In association with rotation of the third gear 363, the end 3521 of the lower torsion bar 352, which is fixed eccentric to the third gear 363 oscillates with respect to the shaft 3631 of the third gear 363 along the groove 3641 formed in the bracket 364. Meanwhile, the other end 3524 of the lower torsion bar 352 is supported with the bearing 313 on the side plate 213, which is fixed at the position on the extension (coaxially with) from the axial center of the shaft 3631 of the third gear 363. Therefore, the end 3524 rotates within the bearing 313 in synchronization with the rotation of the third gear 363.

As described above, the lower torsion bar 352 is rotated by rotationally driving the third gear 363 so that the lower torsion bar 352 and the upper torsion bar 351 rotate with respect to the axial center of the shaft 3631 of the third gear 363, and the axial center of the end 3524 of the lower torsion bar 352, respectively. The range in which the lower torsion bar 352 and the upper torsion bar 351 rotate is determined in accordance with the range in which the end 3521 of the lower torsion bar 352 oscillates along the groove 3641 famed in the bracket 364 (position and length of the groove 3641).

FIG. 4 shows the structure including the first gear 361, the second gear 362, and the third gear 363. So long as the drive unit 37 is arranged without hindrance, it is possible to arrange the first gear 361 and the third gear 363 adjacently to each other by omitting the second gear 362 so that the first gear 361 directly drives the third gear 363. Furthermore, it is possible to provide a fourth gear between the first gear 361 and the second gear 362, or the second gear 362 and the third gear 363.

Each of the second gear 362 and the third gear 363 does not have to have teeth formed on the whole circumference. It is possible to form the teeth on the part corresponding to the angle required for rotating the torsion bar 35.

It is further possible to replace the gear mechanism 36 with a power transmission mechanism foamed by combining the timing belt and the pulley, or combining the chain and the sprocket.

Figure 6:
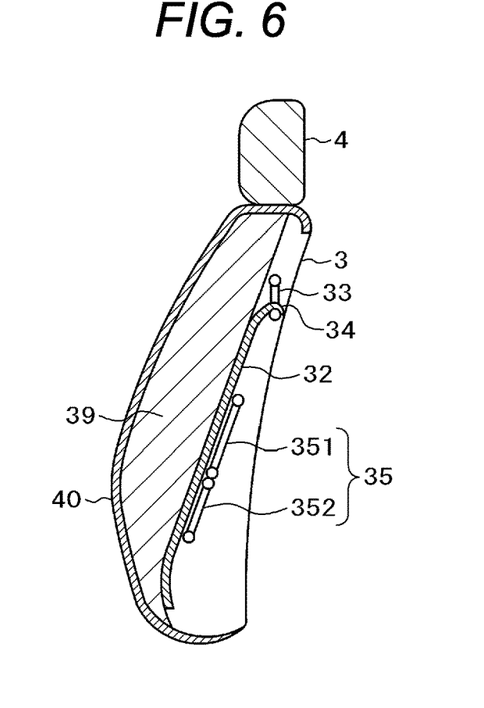
FIG. 6 is a sectional view of the seat back of the vehicle seat according to the first example of the present invention, indicating the state where the resin plate is not pressed by the torsion bar.

FIG. 6 is a sectional view taken along A-A of the seat back 3 as shown in FIG. 1. FIG. 6 omits the seat frame 31 shown in FIGS. 2 and 3 for the purpose of simplifying the explanation. FIG. 6 shows a state that both the upper torsion bar 351 and the lower torsion bar 352 do not positively press the resin plate 32 so that the hook 34 attached to the upper end of the resin plate 32 is hooked on the spring wire 33. The urethane pad 39, and the trim cover 40 for covering the urethane pad 39 are kept in the flat state where no pressing force is exerted from the back surface.

Figure 7:
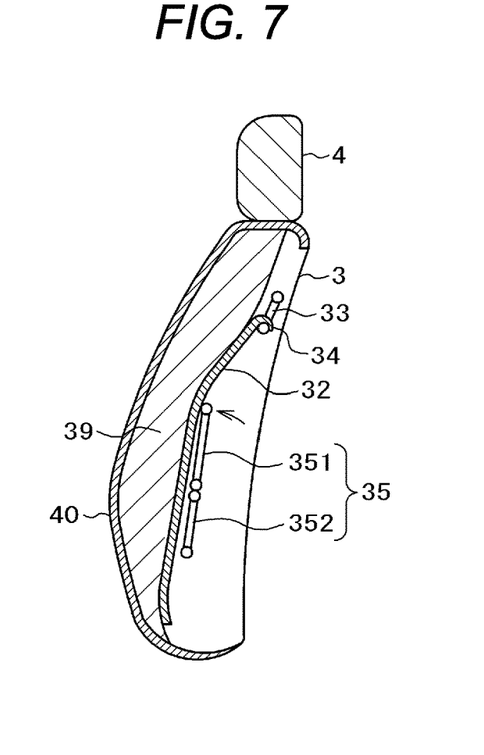
FIG. 7 is a sectional view of the seat back of the vehicle seat according to the first example of the present invention, indicating the state where the upper part of the resin plate is pressed by the torsion bar at the upper side.

Meanwhile, FIG. 7 shows a state that the drive unit 37 is rotationally driven to rotate the torsion bar 35 toward an arrow direction so that the resin plate 32 is pressed forward by the upper torsion bar 351. By pressing the resin plate 32 forward by the upper torsion bar 351, the lumbar of the occupant seated on the vehicle seat 1 may be pressed via the urethane pad 39.

Figure 8:
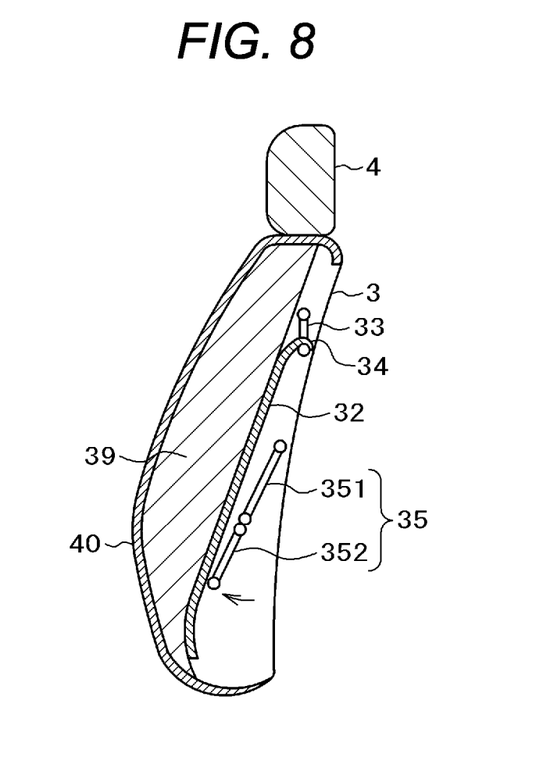
FIG. 8 is a sectional view of the seat back of the vehicle seat according to the first example of the present invention, indicating the state where the lower part of the resin plate is pressed by the torsion bar at the lower side.

In contrast, FIG. 8 shows a state that the drive unit 37 is rotationally driven to rotate the torsion bar 35 toward an arrow direction so that the resin plate 32 is pressed forward by the lower torsion bar 352. By pressing the resin plate 32 forward by the lower torsion bar 352, the pelvis of the occupant seated on the vehicle seat 1 may be pressed via the urethane pad 39.

In this example, the electric motor is employed as the drive unit 37. It is possible to employ a hand-operated brake in place of the electric motor. In such a case, the first gear 361 may be fixed to the shaft of the hand-operated brake.

In this example, the torsion bar 35 has the shape as shown in FIGS. 3 and 4. However, the present invention is not limited to the above-described shape. It is possible to employ variously shaped structure instead of the one as described above.

The example is capable of providing the simply configured mechanism unit for pressing and supporting the lumbar and the pelvis of the occupant seated on the seat by using the fewer components. And the mechanism unit is capable of sharing the components when switching the drive scheme.

[Modified Example 1 of the First Example]

An explanation of the first example has been made by taking the use of the torsion bar 35 as an example. In this modified example, the explanation will be made by taking the use of a plate spring as an example instead of the use of the torsion bar 35.

Figure 9:
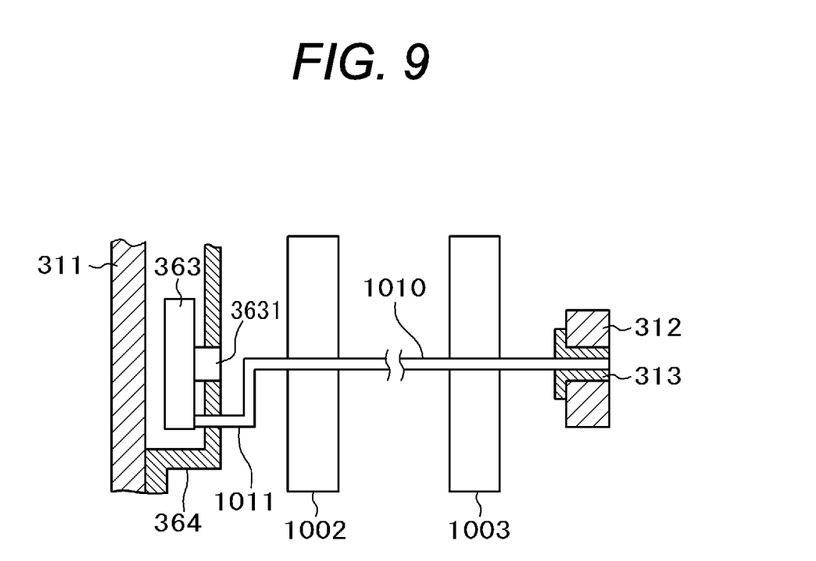
FIG. 9 is a front view of a press member in place of the torsion bar used for the vehicle seat according to a modified example of the first example of the present invention.

FIG. 9 shows the press member famed as the plate spring according to the modified example. The modified example is famed by welding plate springs 1002 and 1003 to a single rod 1010. Likewise the first example, one end 1011 of the rod 1010 is fixed to the third gear 363 at the position eccentric to a center shaft 3631. The other end of the rod 1010 is supported on the side plate 312 with the bearing 313 fixed at the position on the extension (coaxial) from the center shaft 3631 of the third gear 363. The part of the structure from the third gear 363 to the drive unit 37 is the same as the one described in the first example referring to FIG. 4.

Referring to the structure as shown in FIG. 9, upon rotation of the third gear 363 by operating the drive unit 37, the end 1011 of the rod 1010 fixed eccentric to the third gear 363 oscillates to rotate the rod 1010 so that the plate springs 1002, 1003 rotate with respect to the rod 1010. As a result, each top ends of the plate springs 1002, 1003 presses either the upper or the lower part of the resin plate 32 forward to press the urethane pad 39 in the same manner as described in the first example referring to FIGS. 6 to 8.

The number of the plate springs welded to the rod 1010 is not limited to two. Not only one plate spring but also three or more plate springs are connectable as needed. In the case of connecting three or more plate springs, each strength (spring constant) of the plate springs may be made variable depending on the location.

Figure 10:
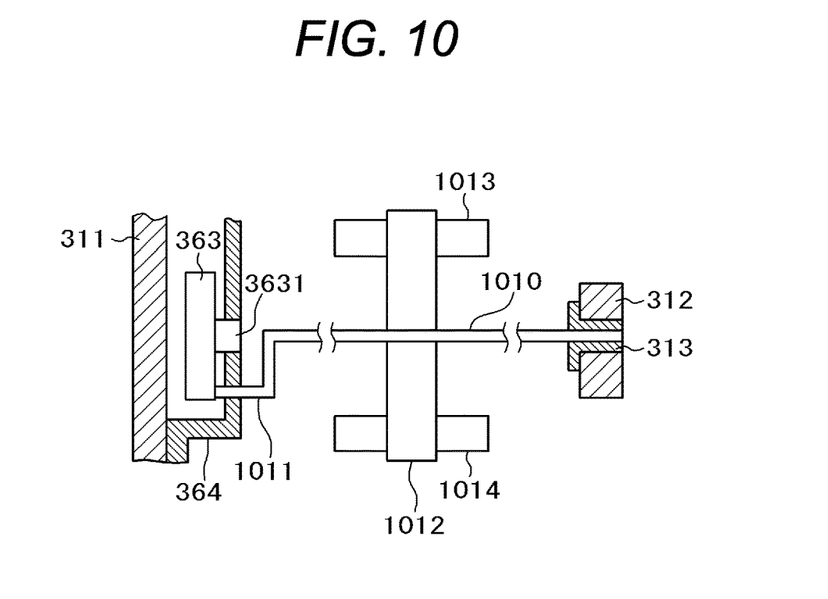
FIG. 10 is a front view of the press member in place of the torsion bar used for the vehicle seat according to a modified example of the first example of the present invention.

It is still possible, as illustrated in FIG. 10, a single plate spring 1012 may be welded to the rod 1010, while having both ends welded respectively to plate materials 1013, 1014, or to round bars each being longer than the width of the plate spring 1012, which are pressed against the resin plate 32.

In contrast to the structure as shown in FIG. 9, the rod 1010 may have its part fixed eccentric to the third gear 363 being elongated so as to allow the plate springs 1002, 1003 to be welded to the elongated part of the rod 1010. In this case, as the third gear 363 rotates, the rod 1010 fixed eccentric to the third gear 363 oscillates together with the plate springs 1002, 1003. As a result, the operation ranges of the plate springs 1002, 1003 may be expanded compared with the operation range where they rotate with respect to the center shaft 3631 of the third gear 363, and the bearing 313 on the side plate 312. This makes it possible to effectively press and support the lumbar and the pelvis of the occupant seated on the seat.

The modified example may provide the similar effects to those derived from the first example as described above.

SECOND EXAMPLE

A second example of the present invention will be described referring to FIGS. 11 to 13B.

In the first example, as shown in FIG. 4, the axial centers of the left end and the right end of the lower torsion bar 352 are not aligned so that the end 3521 is fixed eccentric to the center shaft 3631 of the third gear 363. Meanwhile, in this example, the respective axial centers of the left end and the right end of a lower torsion bar 3502 are aligned. Specifically, one end 35021 of the lower torsion bar 3502 is fixed to a shaft 36301 of the third gear 3630 without eccentric.

Figure 11:
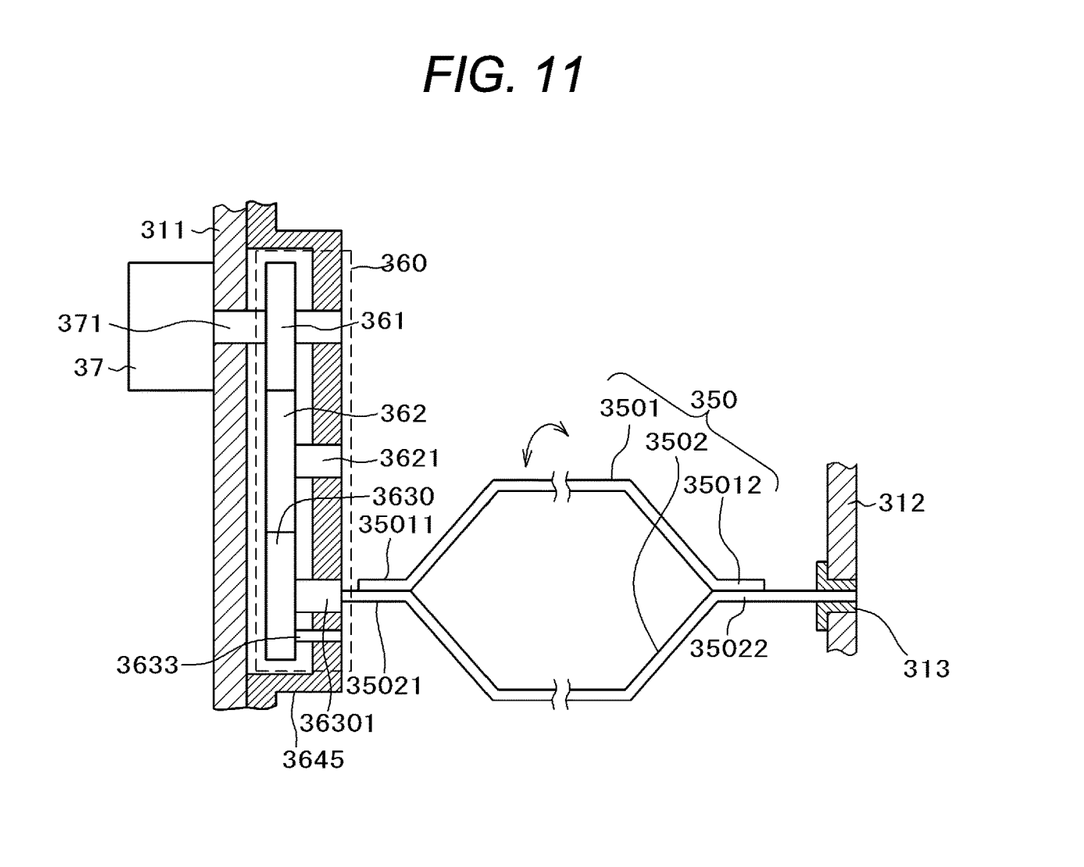
FIG. 11 is a front view of a seat back frame and a torsion bar for a vehicle seat according to a second example of the present invention.

FIG. 11 shows the torsion bar 350, a gear mechanism 360, and the drive unit 37 according to the example in detail. The part of the structure from the drive unit 37 to the third gear 3630 is the same as that of the structure described in the first example referring to FIG. 4, and explanations thereof, thus will be omitted.

Figure 12:
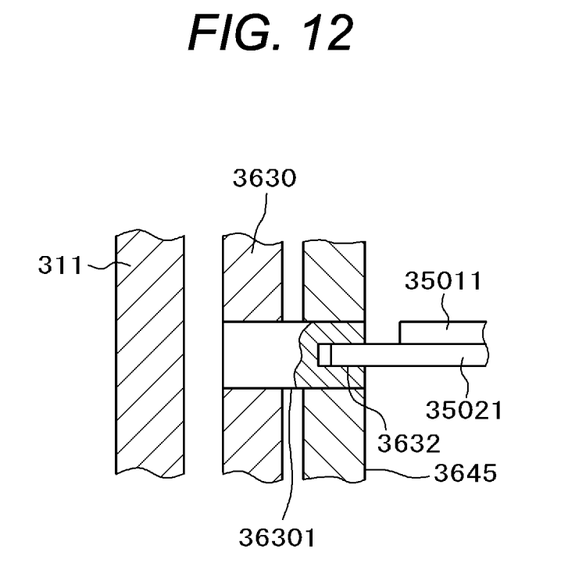
FIG. 12 is a sectional view indicating a state where a shaft of a third gear is fixed to an end of the torsion bar of the seat back frame for the vehicle seat according to the second example of the present invention.

The shaft 36301 for supporting the gear 3630 is rotatably supported with the bracket 3645 through a not shown means (bearing), and has a hole 3632 in the axial center. One end 35021 of the lower torsion bar 3502 is inserted into the hole 3632 so as to be fixed. In this state, as the gear 3630 rotates, the lower torsion bar 3502 rotates together with the shaft 36301.

Referring to FIG. 11, likewise the first example, the other end 35022 of the lower torsion bar 3502 is rotatably supported with the bearing 313 on the side plate 312 of the seat frame 31, which is fixed on a line extended from the center of the shaft 36301 of the gear 3630.

The ends 35011 and 35012 of the upper torsion bar 3501 are respectively welded to the ends 35021 and 35022 of the lower torsion bar 3502, which are rotatably supported coaxially.

Figure 13A:
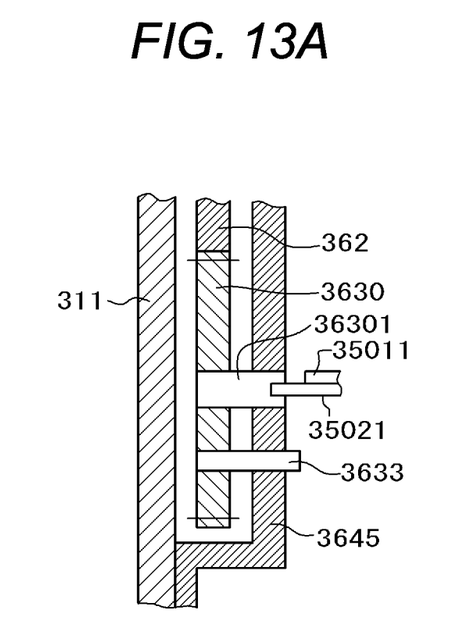
FIG. 13A is a sectional view of the seat back of the vehicle seat according to the second example of the present invention, indicating the fixed part of the torsion bar of the seat back frame and a pin.
Figure 13B:
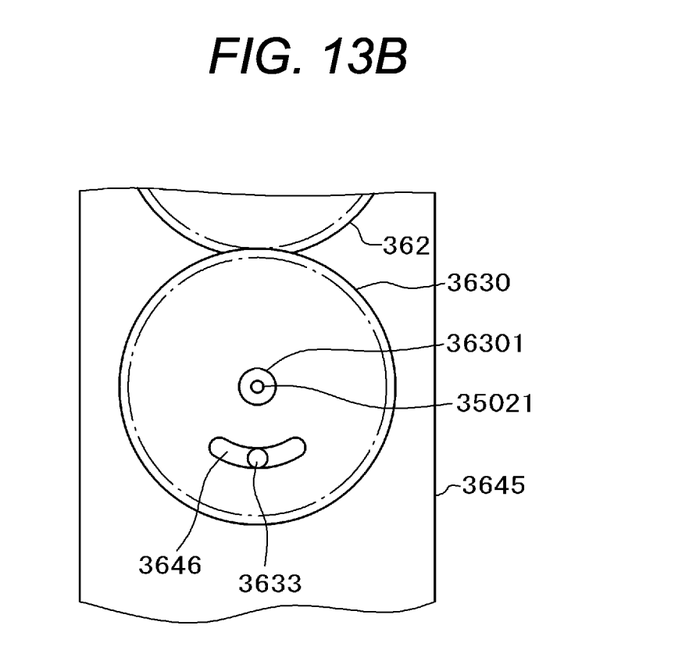
FIG. 13B is a side view of the fixed part of the torsion bar of the seat back frame for the seat back of the vehicle seat according to the second example of the present invention.

As FIGS. 11 and 13A show, a pin 3633 is fixed to the gear 3630 at the position apart from (eccentric to) the shaft 36301. The bracket 3645 has a guide hole 3646 at the position opposite to the pin 3633 as shown in FIG. 13B. Likewise the guide hole 3641 as described in the first example, the guide hole is famed to have a long circular arc shape while having the center of the gear 3630 as the curvature center.

In the above-described structure, when the gear 3630 is rotated and brought into abutment on one end of the guide hole 3646, the gear 3630 stops rotating. Trying to continue driving the gear mechanism 360 in the above-described state, the drive unit 37 will be brought into the overload state. Upon detection of the overload state of the drive unit 37 by the not-shown detection circuit, the drive unit 37 is stopped.

When rotationally driving the drive unit 37 in the above-described structure, the first gear 361, the second gear 362, and the third gear 3630 are rotated so that the shaft 36301 is rotated together with the third gear 3630. Upon rotation of the shaft 36301, the lower torsion bar 3502 having a top end 35021 fixed to the shaft 36301, and the upper torsion bar 3501 having both ends 35011 and 35012 fixed to the lower torsion bar 3502 are rotated in an arrow direction as shown in FIG. 11.

As the torsion bar 350 is rotated as described above, the resin plate 32 is pressed against the urethane pad 39 so as to press the lumbar or the pelvis of the occupant seated on the seat 1 as described in the first example referring to FIGS. 6 to 8.

In this way, the guide hole 3646 serves to regulate the movable range of the pin 3633 fixed to the third gear 3630. The oscillation angle of the torsion bar 350 may be controlled in the relatively inexpensive control mode.

FIG. 11 shows the structure using the first gear 361, the second gear 362, and the third gear 3630. It may be configured to allow the first gear 361 to directly drive the third gear 3630 disposed adjacent to the first gear 361 without using the second gear 362. Furthermore, it may be configured to provide the fourth gear between the first gear 361 and the second gear 362, or between the second gear 362 and the third gear 3630.

Each of the second gear 362 and the third gear 3630 does not have to have teeth formed on the whole circumference. It is possible to form the teeth on the part corresponding to the angle required for rotating the torsion bar 350.

It is further possible to replace the gear mechanism 360 with a power transmission mechanism foamed by combining the timing belt and the pulley, or combining the chain and the sprocket.

In the example, the movable range of the pin 3633 fixed to the third gear 3630 is regulated with the guide hole 3646 so that the oscillation angle of the torsion bar 350 is controlled. It is possible to control the rotation angle of the output shaft 371 through the drive unit without using the pin 3633. Specifically, the pulse motor is employed as the drive unit 37. Then the pulse number for driving the pulse motor is controlled so that the oscillation angle of the torsion bar 350 becomes controllable by regulating the rotation angle of the output shaft 371.

In place of the pulse motor, the drive unit 37 may be constituted by combining the inexpensive commercial motor, means for detecting the rotation angle of the output shaft 371 (for example, rotary encoder), and the brake mechanism. In such a case, the rotation angle detection means detects the rotation angle of the output shaft of the motor, and stops rotation of the motor by applying the braking force at the timing when the predetermined rotation angle is detected. This makes it possible to control the oscillation angle of the torsion bar 350.

[Modified Example of Second Example]

Figure 14:
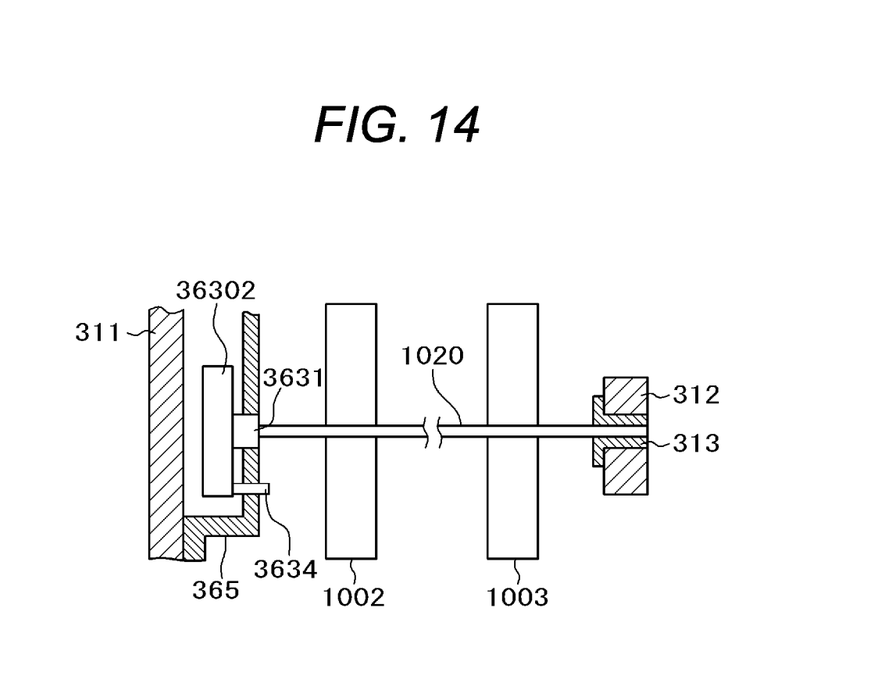
FIG. 14 is a front view of the press member in place of the torsion bar used for the vehicle seat according to a modified example of the second example of the present invention.

It is possible to replace the torsion bar 350 with the press member configured as described in the modified example of the first example referring to FIG. 9 or 10. That is, as shown in FIG. 14, the torsion bar 350 is replaced with a single bar material (round bar or angular bar) 1020 to which the plate springs 1002 and 1003 are fixed through welding as described referring to FIG. 9. In this case, the rotation angle of the bar material 1020 is determined in accordance with the operation range of the pin 3634 fixed to a third gear 36302. The operation range is defined by the position and length of the long hole 3646 formed in the bracket 3645 as described referring to FIG. 13B.

Figure 15:
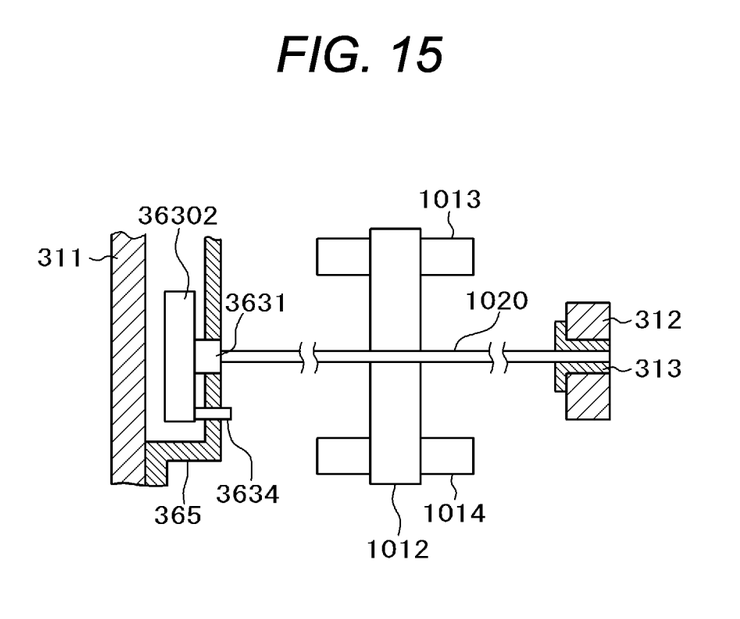
FIG. 15 is a front view of the press member in place of the torsion bar used for the vehicle seat according to a modified example of the second example of the present invention.

Referring to FIG. 15, it is possible to connect the plate spring 1012 to the bar material 1020 through welding, and further connect both ends of the plate spring 1012 to the plate materials 1013, 1014, or the round bar each longer than the width of the plate spring 1012 through welding for pressing the resin plate 32 as described in the modified example of the first example referring to FIG. 10. In such a case, the rotation angle of the bar material 1020 is determined in accordance with the operation range of the pin 3634 fixed to the third gear 36302. The operation range is defined by the position and length of the long hole 3646 formed in the bracket 3645 as described referring to FIG. 13B.

For the structure as shown in FIG. 14 or 15, it is possible to integrally form the bar material 1020 and the center shaft 3631 of the third gear 36302 from the same member. In other words, the integrated structure may be foamed by extending the center shaft 3631 of the third gear 36302 to reach the bearing 313 fixed to the side plate 312 of the seat frame 31 so as to weld the plate springs 1002, 1003 or the plate spring 1012 to the center shaft 3631.

In the modified example, it is possible to control the rotation angle of the output shaft 371 through the drive unit 37 using the means as described in the last part of the second example without using the pin 3633.

The invention made by the inventors have been specifically described based on the examples. The present invention is not limited to those examples as described above, but includes various modifications so long as it does not deviate from the scope of the invention. For example, the examples are described in detail for readily understanding of the present invention which is not necessarily limited to the one equipped with all structures as described above. It is possible to add, remove, and replace a part of the structure to, from and with a part of another structure of the example.

REFERENCE SIGNS LIST

1: vehicle seat,
2: seat cushion,
3: seat back,
31: seat frame,
32: resin plate,
33: spring wire,
35, 350: torsion bar,
351, 3501: upper torsion bar,
352, 3502: lower torsion bar,
36: gear mechanism,
37: drive unit,
39: urethane pad

The invention claimed is:

1. A vehicle seat including a seat cushion on which an occupant is seated, and a seat back on which the back of the occupant seated on the seat cushion reclines, wherein:
the seat back includes a urethane pad having its surface covered with a trim cover, a seat frame constructed to form an outline of the seat back and equipped with side plates on opposite sides, a spring wire hooked to the side plates, a resin plate attached to the seat frame via the spring wire, and a pressing device having a laterally extending shaft and press members arranged at upper and lower sides in a longitudinal direction with respect to the shaft, the pressing device being disposed at the back side of the urethane pad surface covered with the trim cover with the resin plate interposed therebetween; and
the laterally extending shaft of the pressing device is rotated or oscillated to allow the press member at the upper side to press an upper part of the urethane pad forward by pressing an upper part of the resin plate attached to the seat frame via the spring wire, or the press member at the lower side to press a lower part of the urethane pad forward by pressing a lower part of the resin plate attached to the seat frame via the spring wire.

2. The vehicle seat according to claim 1, wherein the press members of the pressing device are configured with a pair of torsion bars at the upper side and the lower side arranged in a longitudinal direction with respect to the laterally extending shaft.

3. The vehicle seat according to claim 1, wherein the pressing device is configured by fixing a plate spring to the laterally extending shaft.

4. The vehicle seat according to claim 1, further comprising a drive unit for rotating or oscillating the laterally extending shaft of the pressing device.

5. The vehicle seat according to claim 4, wherein the drive unit for rotating or oscillating the laterally extending shaft of the pressing device employs an electric motor as a drive source.

6. The vehicle seat according to claim 4, wherein the drive unit for rotating or oscillating the laterally extending shaft of the pressing device employs a hand-operated brake as a drive source.

7. A vehicle seat including a seat cushion on which an occupant is seated, and a seat back on which the back of the occupant seated on the seat cushion reclines, wherein:
the seat back includes a urethane pad having its surface covered with a trim cover, and a pressing device having a resin plate for supporting a part of the urethane pad, a laterally extending shaft, and press members arranged at upper and lower sides in a longitudinal direction with respect to the shaft, the pressing device being disposed at the back side of the urethane pad surface covered with the trim cover;
the laterally extending shaft of the pressing device is rotated or oscillated in one direction so that the press member at the upper side presses an upper part of the urethane pad forward via the resin plate; and
the laterally extending shaft of the pressing device is rotated or oscillated in a direction opposite to the one direction so that the press member at the lower side presses a lower part of the urethane pad forward via the resin plate.

8. The vehicle seat according to claim 7, wherein the press members of the pressing device are configured with a pair of torsion bars at the upper side and the lower side arranged in a longitudinal direction with respect to the laterally extending shaft.

9. The vehicle seat according to claim 7, wherein the pressing device is configured by fixing a plate spring to the laterally extending shaft.

10. The vehicle seat according to claim 7, further comprising a drive unit for rotating or oscillating the laterally extending shaft of the pressing device.

11. The vehicle seat according to claim 10, wherein the drive unit for rotating or oscillating the laterally extending shaft of the pressing device employs an electric motor as a drive source.

12. The vehicle seat according to claim 10, wherein the drive unit for rotating or oscillating the laterally extending shaft of the pressing device employs a hand-operated brake as a drive source.

* * * * *